United States Patent
Sørensen et al.

(10) Patent No.: US 10,236,741 B2
(45) Date of Patent: Mar. 19, 2019

(54) METHOD AND TEST TOOL FOR ADJUSTING BRUSH HOLDERS IN SLIP RING SYSTEMS

(71) Applicant: Vestas Wind Systems A/S, Aarhus N. (DK)

(72) Inventors: Kim Sveinsson Sørensen, Ry (DK); Kim Kristensen, Holstebro (DK)

(73) Assignee: Vestas Wind Systems A/S, Aarhus N (DK)

( * ) Notice: Subject to any disclaimer, the term of this patent is extended or adjusted under 35 U.S.C. 154(b) by 137 days.

(21) Appl. No.: 15/504,135

(22) PCT Filed: Sep. 16, 2015

(86) PCT No.: PCT/DK2015/050276
§ 371 (c)(1),
(2) Date: Feb. 15, 2017

(87) PCT Pub. No.: WO2016/055066
PCT Pub. Date: Apr. 14, 2016

(65) Prior Publication Data
US 2017/0244297 A1    Aug. 24, 2017

(30) Foreign Application Priority Data
Oct. 8, 2014   (DK) ................................. 2014 70624

(51) Int. Cl.
H01R 39/08     (2006.01)
H01R 39/38     (2006.01)
(Continued)

(52) U.S. Cl.
CPC ............. H02K 5/141 (2013.01); H01R 39/08 (2013.01); H01R 39/385 (2013.01); H01R 39/40 (2013.01);
(Continued)

(58) Field of Classification Search
CPC ...... H02K 13/00; H01R 39/38; H01R 39/381; H01R 39/383; H01R 39/385
(Continued)

(56) References Cited

U.S. PATENT DOCUMENTS 983,230 A      1/1911  Hoehme
3,538,362 A *  11/1970 Cheetham ............... H02J 7/248
                                                310/171

(Continued)

OTHER PUBLICATIONS

European Patent Office, International Search Report and Written Opinion in PCT Application No. PCT/DK2015/050276, dated Feb. 25, 2016.
(Continued)

Primary Examiner — Abdullah A Riyami
Assistant Examiner — Thang H Nguyen
(74) Attorney, Agent, or Firm — Wood Herron & Evans LLP

(57) ABSTRACT

The invention relates to a method of adjusting a brush holder (41) of a slip ring and brush assembly comprising at least one slip ring (50) with a radius of curvature R. With the method a test tool (80) is used to simulate a brush in the brush holder with the important difference that the test tool is able to indicate to the operator whether full contact between the slip ring and the contact surface of the test tool is obtained.

21 Claims, 5 Drawing Sheets

(51) Int. Cl.
 H02K 13/00 (2006.01)
 H02K 5/14 (2006.01)
 H02K 15/00 (2006.01)
 H01R 39/40 (2006.01)

(52) U.S. Cl.
 CPC ............ *H02K 15/00* (2013.01); *H01R 39/38* (2013.01); *H02K 2213/09* (2013.01)

(58) Field of Classification Search
 USPC .................................................. 310/232, 239
 See application file for complete search history.

(56) References Cited

U.S. PATENT DOCUMENTS

| | | | | |
|---|---|---|---|---|
| 4,443,945 A * | 4/1984 | Takemura | ................ | G01B 3/18 33/1 PT |
| 4,593,221 A * | 6/1986 | Harris | .................... | H02K 5/148 29/597 |
| 6,023,851 A * | 2/2000 | Brand | .................... | H02K 5/148 33/645 |
| 8,552,615 B2 * | 10/2013 | Zhao | .................... | H02K 11/026 310/239 |
| 2003/0151328 A1 * | 8/2003 | Cutsforth | ............... | H01R 39/38 310/239 |
| 2004/0119370 A1 | 6/2004 | Tekawade | | |
| 2012/0169176 A1 * | 7/2012 | Toledo | .................... | H01R 39/42 310/240 |
| 2013/0218514 A1 * | 8/2013 | Schieke | ................. | H01R 39/58 702/138 |
| 2014/0246945 A1 * | 9/2014 | Stroberg | ................ | H02K 5/148 310/242 |
| 2017/0005550 A1 * | 1/2017 | Pacciani | .............. | H02K 13/003 |
| 2017/0149301 A1 * | 5/2017 | Verot | .................... | H02K 5/148 |

OTHER PUBLICATIONS

Danish Patent and Trademark Office, Search Opinion in PA 2014 70624, dated Apr. 28, 2015.

* cited by examiner

# METHOD AND TEST TOOL FOR ADJUSTING BRUSH HOLDERS IN SLIP RING SYSTEMS

FIELD OF THE INVENTION

The present invention relates to a test tool for adjusting the brush holders on either generators or motors which are equipped with slip ring systems.

BACKGROUND OF THE INVENTION

A wind turbine converts wind power into electrical energy through a generator driven by the blades of the wind turbine under windy conditions. In some wind turbines, the generator comprises a stator and a rotor both having multiphase windings, such as a double-fed induction generator, a cascade-regulated generator, an induction or a synchronic generator, or even a dc generator.

When having a rotor rotating in relation to a stator of a generator, electricity has to be transferred to or from the rotor. Electricity may be transferred by means of a slip ring assembly also called a rotary electrical interface, rotating electrical connector, collector, or swivel or electrical rotary joint, enabling the rotor to receive or return electricity while rotating in relation to the stator. When having a rotor with a multiphase winding, a control system within the wind turbine is able to regulate the frequency, so that the wind turbine produces at a predetermined frequency, e.g. approximately 50 Hz.

Typically, the slip ring assembly comprises a rotational slip ring unit rotating with the rotor and having conductive rings or bands. Furthermore, the slip ring assembly is in contact with brushes having sliding contact with the rings for transferring electricity from the rotor. Thus, the electricity is transferred from the slip ring unit to the rotor windings in order to control the electrical field in the generator. The electricity is transferred to the slip ring unit by means of brushes bearing against the conductive rings, typically three conductive rings—one for each electrical phase.

Upon mounting of the brushes in the brush holders, it is important that there is full contact between brush(es) and the conductive ring(s) in order to avoid point contact leading to too high current density on the brushes. The contact surface of each brush is shaped as an arcuate surface, typically around 1 cm×5 cm, where the radius of curvature is aligned with the radius of curvature of the slip ring. Indeed, due to the limited visual access to the bearing surfaces and as should be clear by looking at e.g. FIGS. 2 and 3, it may be difficult to ascertain visually whether there is full contact between slip ring and brush, and significant guess work may be involved. The consequence is that a full initial contact between the brush and the conductive ring may not be reliably achieved.

It is an object of the present invention to facilitate a correct mounting of the brushes to establish full contact with the slip ring.

SUMMARY OF THE INVENTION

The present invention relates to a method of adjusting a brush holder of a slip ring and brush assembly comprising at least one slip ring with a radius of curvature R. With the method a test tool is inserted in a brush holder replacing a brush position since the test tool in relevant parameters is shaped as a brush and further comprising a contact surface with a concave surface having a radius of curvature R corresponding to the slip ring radius of curvature R as a brush. Further the method includes adjusting an adjustable connection of said brush holder to reach a full contact between the contact surface and the slip ring and finally fixating the brush holder in that position on said slip ring and brush assembly for which the test tool has indicated a full contact.

One aspect of the invention relates to a method of adjusting a brush holder of a slip ring and brush assembly, wherein said slip ring and brush assembly comprises at least one slip ring with a radius of curvature R and at least one brush holder for holding a brush therein to abut the slip ring and being adjustably mounted to the slip ring; said method comprising the following steps:
  inserting a test tool in said brush holder;
  adjusting an adjustable connection of said brush holder until a position has been reached in which said test tool indicates that a correct positioning of the brush holder has been achieved;
  fixating said brush holder in said position.

A further aspect of the invention relates to a test tool for indicating correct mounting of a brush holder on a generator or a motor equipped with slip ring systems; said test tool comprising an elongate form with a constant cross-section so that it can be inserted into a brush holder of a slip ring and brush assembly and further comprising areas or points of contact along a concave surface of radius of curvature R;
  said test tool comprising an actuator for being actuated when said areas or points of contact is brought together with an object with a radius of curvature R; and
  said test tool comprising an indicator to indicate actuation of said actuator.

The present invention further relates to a slip ring and brush assembly to be used in the above method.

With the tool and method according to embodiments of the present invention, an improved mounting of brushes has been obtained. It can directly be seen with the tool whether the brush holder is aligned properly such that subsequent insertion of the brushes establishes full contact with the slip ring or whether the brush holder has to be further realigned since the diode at the top will light up when the brush holder is aligned correct.

The test tool can be used for adjusting the brush holders on either generators or motors which are equipped with slip ring systems. Some benefits are to minimise the wear tear and reduce the service cost and improve the reliability of performance for the generators and motors equipped with slip ring systems.

BRIEF DESCRIPTION OF THE DRAWINGS

Embodiments of the invention will now be described, by way of example only, and with reference to the accompanying drawings, in which.

The accompanying drawings are not intended to be drawn to scale. In the drawings, each identical or nearly identical component that is illustrated in various figures may be represented by a like numeral. For purposes of clarity, not every component may be labelled in every drawing.

DETAILED DESCRIPTION OF THE DRAWINGS

Figure 1:
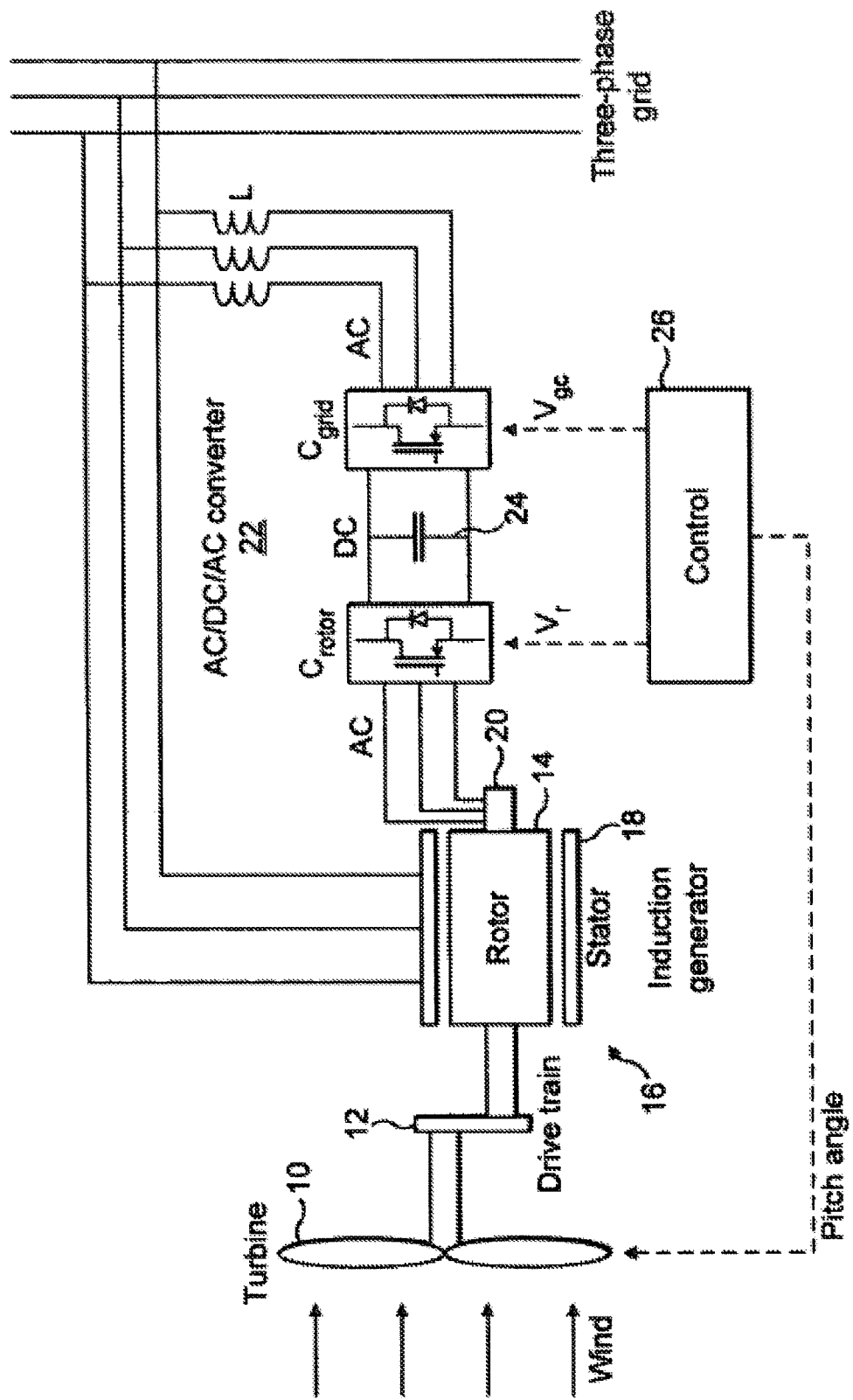
FIG. 1 is a schematic view of a wind turbine induction generator and slip ring and brush assembly.

FIG. 1 shows a schematic view of a wind turbine. Turbine blades 10 are driven by incident wind and, via a drive train 12, cause rotation of an electrical rotor 14 of a three phase induction generator 16. A stator 18 has a three phase winding which is connected directly to the transmission grid and the three phase rotor winding is connected via a slip ring and brush assembly 20 to the rotor side $C_{rotor}$ of a converter 22, the grid side of which $C_{grid}$ is coupled via coupling inductors L to the grid. $C_{rotor}$ and $C_{grid}$ are AC/DC converters with DC voltage being provided by a capacitor 24 arranged between the converters. A control system 26 generates a pitch angle command to set the pitch angle of the turbine blades and provides voltage controls Vr and Vgc to $C_{rotor}$ and $C_{grid}$ respectively to control wind turbine power, DC voltage and reactive power at the grid terminals. Modern large scale wind turbines also have sophisticated control systems which can sense and control various parameters within the turbine assembly and in the connection between the turbine and the grid.

Figure 2:
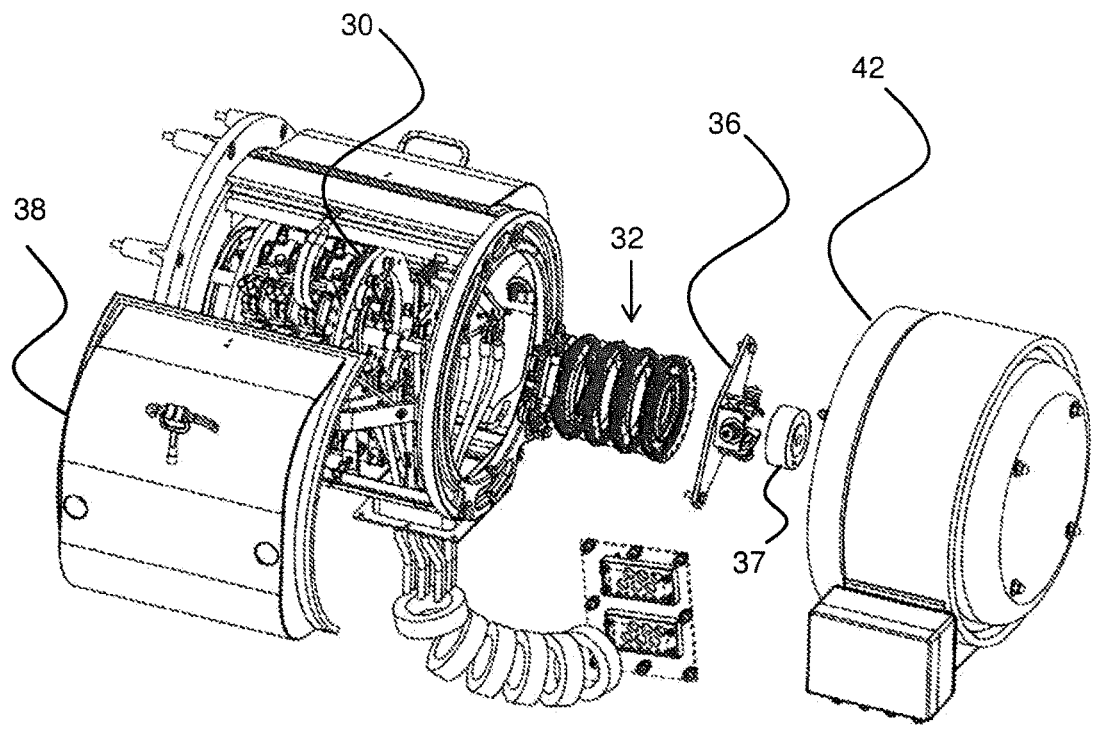
FIG. 2 is an exploded view of the slip ring and brush assembly.

FIG. 2 shows an embodiment of a slip ring and brush assembly. A brush frame 30, shown in more detail in FIG. 3, has three pairs of slip ring brushes and a ground contact brush and is arranged around slip ring assembly 32 which is shown in more detail in FIG. 5. Earth brush arrangement 36 is received at one end of the slip ring assembly 32. The brush frame 30, slip ring assembly 32, earth brush arrangement 36 and encoder 37 are received in a slip ring housing 38 which is mounted on the main generator housing over the rotor shaft. The shaft extends through an aperture in the housing and the slip ring assembly is fixed to the shaft to rotate with the rotor. A filter housing 42 is attached to the end of the slip ring housing remote from the generator housing to seal the slip ring assembly.

Figure 3:
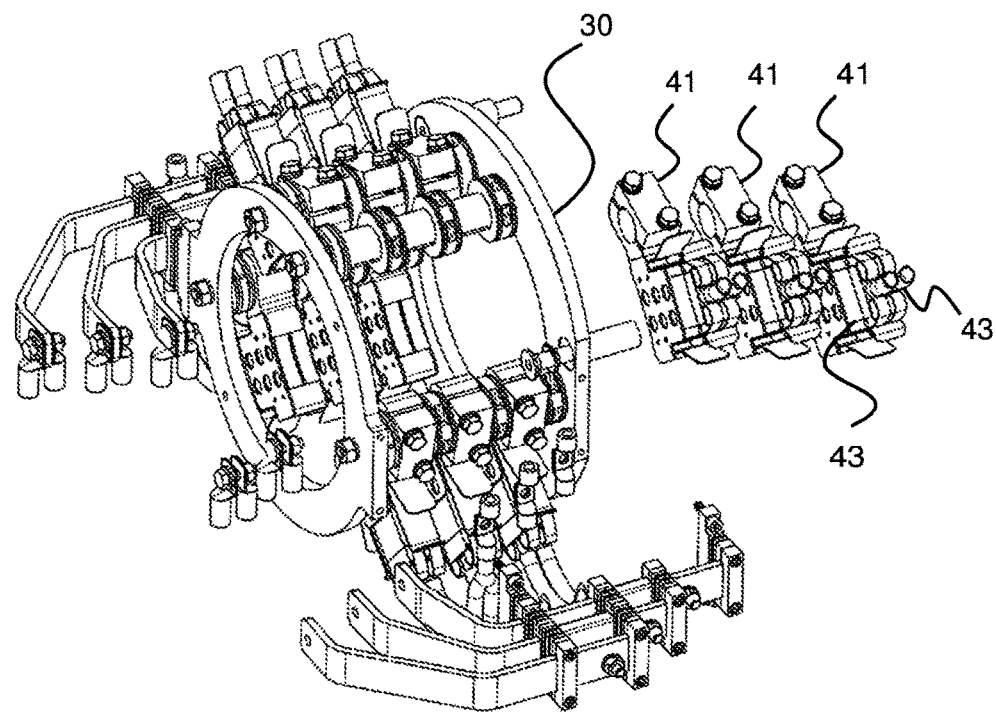
FIG. 3 is a perspective view of a slip ring brush gear assembly.
Figure 4:
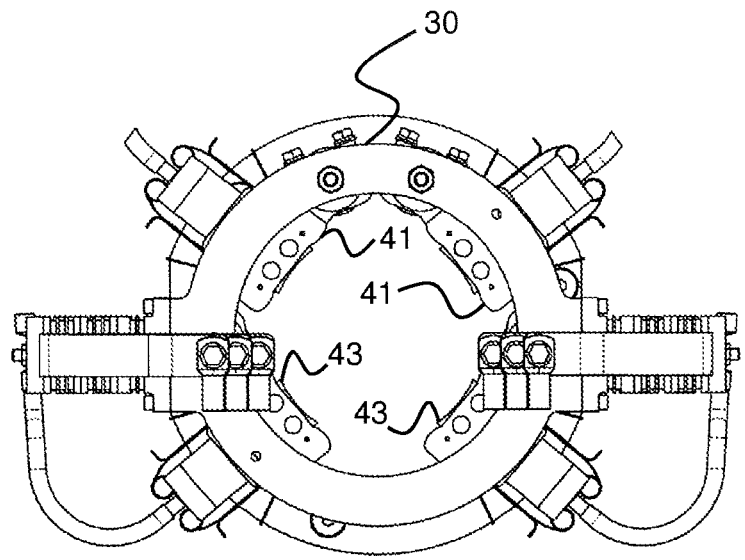
FIG. 4 is an end view of the slip ring brush gear assembly of FIG. 3.

FIGS. 3 and 4 show the slip ring brush gear assembly in more detail. The assembly comprises four times three double brush holders 41, which can be seen more in detail in FIGS. 6 and 7 each having a pair of brushes 43. The brush holders 41 are mounted on a frame 30 together with a ground contact brush (not shown). One slip ring is provided for each of the three phases with a fourth providing a ground contact. Thus, there are eight graphite brushes per phase and a further brush for contact with the ground slip ring. In total in the shown embodiment, the slip ring and brush assembly comprises 12 brush holders with a total of 24 brushes. This number may vary with e.g. at least 6 or at least 9 brush holders. The adjustment of the brush holders according to embodiments of the present invention may be carried out with all brush holders during installation of the slip ring and brush assembly or just with a smaller number.

Figure 5:
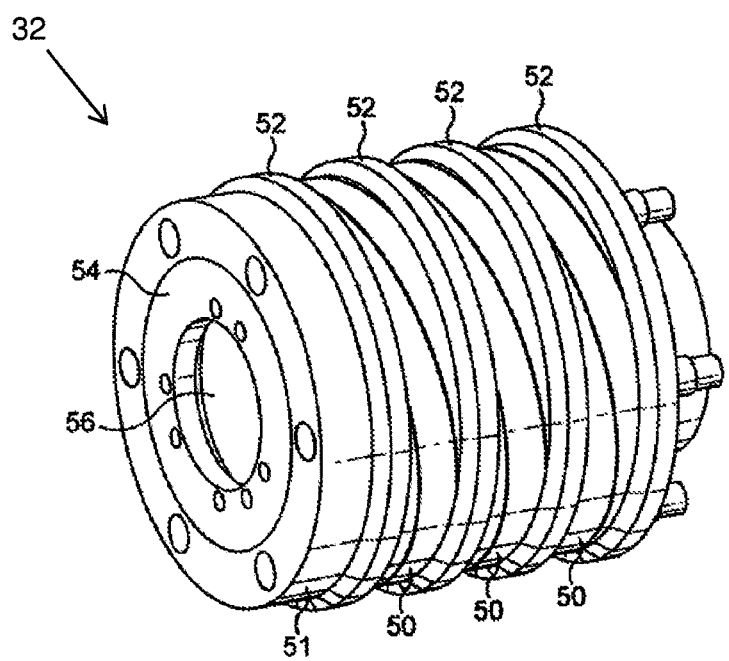
FIG. 5 is a perspective view of the slip ring assembly.

FIG. 5 shows the slip ring assembly 32 which comprises the three slip rings 50 and a driving ring 51. The rings are mounted on a bush 54 and are separated by ribbed isolating rings 52. The slip ring assembly has a central aperture 56 which receives an end of the rotor. The slip rings can be made of any kind of conductive material which also has a high thermal conductivity and hardness, such as brass or copper.

A major part of the present invention is the use of a test tool which is used to simulate a brush in the brush holder with the important difference that the test tool is able to indicate to the operator whether full contact between the slip ring and the contact surface of the test tool is obtained. The test tool may be used with all brush holders during installation of the slip ring and brush assembly or just with a smaller number.

Figure 6:
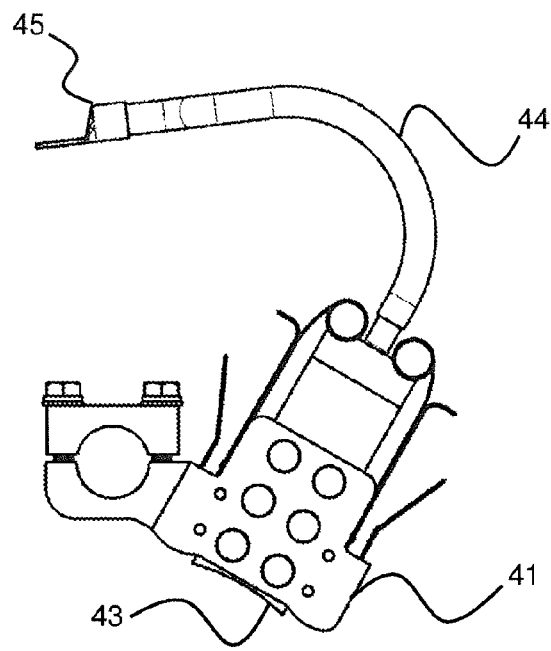
FIG. 6 is a perspective view of a set of brushes and a brush holder.
Figure 7:
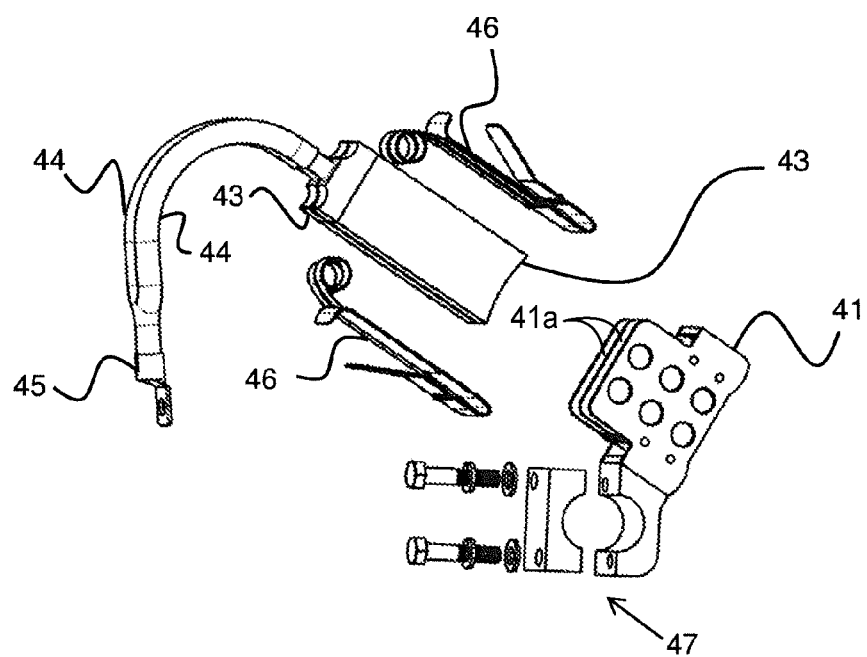
FIG. 7 is an exploded view of the set of brushes and a brush holder in FIG. 6.

FIGS. 6 and 7 show the brush and brush holder in more detail. Each brush holder 41 provides seats for two brushes 43 via corresponding openings 41a in the brush holder 41. Correspondingly, the brushes 43 are combined two and two with individual cables 44 combining into one single electrical connection 45. Further, clamps 46 are provided to fixate the brushes in the brush holder with a downwards pressure against the slip ring. The brush holder is fixed to the frame 30 or another part of the slip ring assembly through an adjustable connection 47 in order for the brushes to be installed correctly. In the shown embodiment, the adjustable connection 47 allows for rotational movement only; hereby when rotating the adjustable connection 47, the combination of this rotational movement with the resulting radial movement of the brush/test tool in the brush holder creates a resulting adjustment to the contact surface between the brush/test tool and the slip ring, assisted by the clamps 46 pushing the brush/test tool towards the slip ring. Hereby by using the test tool according to embodiments of the present invention, a correct positioning of the brush holder may be obtained, thereby resulting in a desired full contact between each brush 43 and the slip ring 50; thereby avoiding point contact leading to too high current density on the brushes.

Typically, as described herein, the test tool is kept in said brush holder during adjustment of the position of the brush holder. However, the test tool may also be inserted in the brush holder to check for instant correct alignment and removed again before a possible additional adjustment is carried out. This may be relevant for some slip ring and brush assemblies where it may be difficult to reach the adjustable connection when the test tool is inserted.

Slip ring brushes are usually carbon based, for example, a graphite or carbon silver alloy, but they can be made from any kind of conductive material, such as graphite, carbon, stainless steel, silver, copper, or a mixture thereof. Although referred to as brushes, slip ring brushes are typically solid blocks of material but could also be e.g. a wire, a strip, or a mesh. Design of the brushes will often be governed to avoid too high current density. In general the current density of the brush should not exceed 4 $A/mm^2$; however this number may be allowed higher for some mixtures of the brush material. Consequently, sizes of the brushes (and thereby the test tool) may vary a lot; examples may be (with reference to FIGS. 8 and 9) a width (W) of between 20 and 75 mm, and a thickness of between 5 and 30 mm. The height (H) of the brush depends on desired life time of the brush, but may typically be between 100 and 300 mm.

Embodiments of the present invention provide a tool and a method to be used for ensuring full accurate contact between the slip ring and brush.

Figures 8, 9:
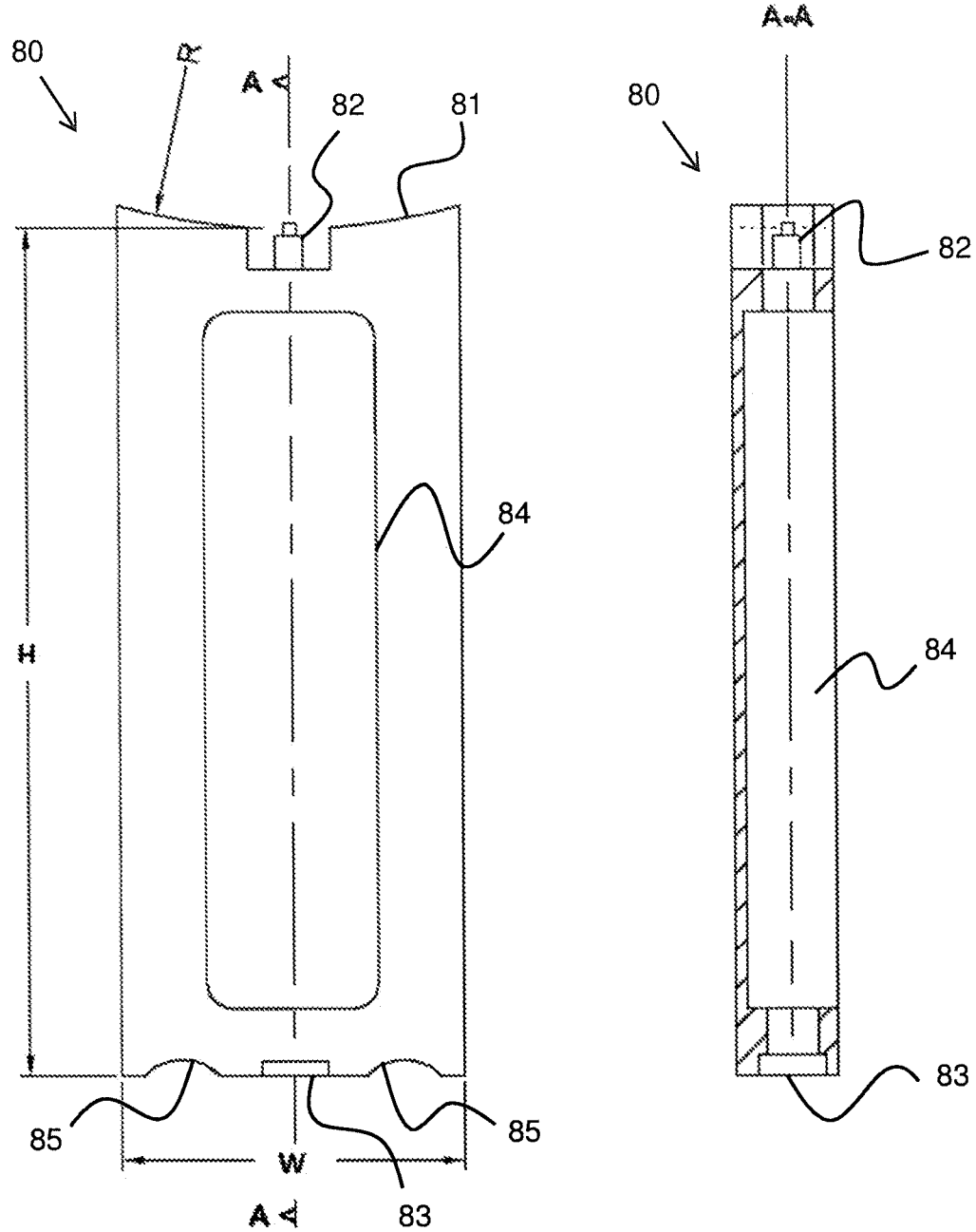
FIG. 8 is a perspective view of a test tool according to an embodiment of the present invention.
FIG. 9 is a cross-sectional side view of FIG. 8 along A-A.

FIGS. 8 and 9 show a test tool 80 according to an embodiment of the present invention. At the top is seen the contact surface 81 with a radius of curvature R matching the radius of curvature of the brush to be installed and the slip ring on which the brush is to be installed. Further the dimensions of the test tool 80 correspond to the dimensions of a brush, which means that the test tool 80 can be inserted and push-fitted into any of the two slots in the brush holder 41 ending up in a same position as a brush 43 being inserted into the same brush holder. Hereby, if the brush holder is mounted such that a full contact between the contact surface of the test tool 80 and the slip ring surface is achieved, then the brush holder is also mounted correctly for ensuring a full contact when a brush is fitted therein.

It is important to point out that the brush holder defines an opening into which the brush can be push-fitted along a pre-defined one-dimensional path in the brush holder leading the brush into a unique position in the brush holder when the brush contacts the slip ring. The test tool is shaped similar to a brush in the relevant dimensions such that the test tool upon insertion in the brush holder will follow the same pre-defined one-dimensional path in the brush holder and stop at the same unique position in the brush holder as the position where the brush would stop upon insertion. Therefore, adjusting the brush holder position based on an inserted test tool into an ideal position can be directly used to ensure correct positioning when inserting a brush afterwards. With the term "unique position" is meant that for a slip ring and brush holder kept fixed, the insertion of a brush or test tool into the brush holder until stopped by the slip ring would result in the brush or test tool stopping the exact same place.

As is clear from FIG. 8, only slight variation in the insertion angle of the test tool/brush in the brush holder will result in only part of the contact surface in one of the sides establishing contact with the slip ring. When the slip ring is in use to transfer electricity between the brush and the slip ring this may be highly problematic, as the full contact surface should be used for transfer of electricity to avoid point contacts high current and resulting overheating.

With the step of introducing the test tool 80 in the brush holder 41, the process of ensuring full contact is made much easier. At the center of the contact surface 81 of the test tool 80, an actuator, such as a push button actuator 82, is positioned such that it is actuated if and only if there is a full contact between the contact surface 81 and the slip ring 50. That means that the point of actuation can only be reached when both sides of the contact surface touch the slip ring. It is to be kept in mind that the contact surface 81 of the test tool 80 has a radius of curvature R matching the radius of curvature of the brush to be installed and also the slip ring on which the brush is to be installed. Therefore, the step of fixing a brush holder in a position where the push button actuator 82 is actuated when the test tool is inserted ensures that full contact will be present when the brush(es) will afterwards be mounted in the brush holder. Alternative actuators may be used as well for observing full contact, such as using a contact sensor based on piezoelectricity or any other actuator known by the skilled person in the art.

When the test tool 80 reaches a position where the push button actuator is actuated, a signal is sent to the opposite end of the test tool 80, where an indicator 83, such as an LED, is positioned for easy and fast recognition of the operator that the correct positioning has been achieved. An electronic circuit to provide for a signal from the push button actuator resulting in a signal, such as a LED being turned on, is positioned within a chamber 84 inside the test tool 80. This chamber may be accessible via some kind of cover. How to design the electronic circuit will be within the knowledge of the skilled person in the art. Alternative indicators may be used as well for indicating full contact, such as a sound generator or any other indicator known by the skilled person in the art.

A typical way to perform the method according to an embodiment of the invention will be to insert the test tool 80 in the brush holder 41 via the one-directional path defined through the brush holder 41 until the test tool reaches its unique position when abutting the slip ring 50. In this first insertion, typically the test tool will only touch the slip ring with one side of the contact surface 81 or only one point of contact due to the less than perfect orientation of the brush holder, causing it to not line up properly. Therefore, the adjustable connection 47 of the brush holder is adjusted, rotationally in the shown embodiment, until a position has been reached where the test tool contact surface establishes full contact with the slip ring, in which case the push-button actuator of the test tool is pushed down to a level where a signal is sent to the LED, which turns on to indicate that full contact is established, and thereby that the brush holder 41 is correctly positioned and should be correctly fixed in this position. Afterwards the test tool may be removed and a brush may instead be inserted, and the brush will hereby be correctly mounted and establish a full contact of the contact surface with the slip ring.

The present invention may be used with a large number of different radii of slip rings, and therefore also different radii of the contact surface of the test tool. Therefore, according to different embodiments, the radius of curvature R may be between 50 and 500 mm, such as between 55 and 400 mm, between 60 and 300 mm, between 65 and 200 mm, or between 70 and 100 mm.

Finally, it is noted that the test tool 80 comprises two indentations 85 for receiving part of the releasable clamps 46 when inserted into and fixed in a brush holder 41. These indentations are similar as the ones on the brushes thereby ensuring a similar mounting of the test tool as of the brushes.

The test tool may be manufactured in a number of suitable materials for which contact surface 81 is sufficient resistant to deformation. One example of material may be steel.

It is important to notice that the present invention is related to a test tool for various slip ring and brush assemblies, so the exact design of the shown slip ring and brush assembly should not be considered limiting in any way.

It should be understood that aspects of the invention are described herein with reference to the figures, which show illustrative embodiments in accordance with aspects of the invention. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

Consequently, the invention should not be limited to use with wind turbines, as the tool may be used with slip ring assembly in any kind of generator comprising both a rotating stator and a rotating rotor, such as a double-fed induction generator, a cascade-regulated generator, an alternator, or a synchronic generator. The tool slip ring assembly may also be used in electrical motors.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of the invention as defined by the claims. Accordingly, the foregoing description and drawings are by way of example only.

The invention claimed is:

1. A method of adjusting a brush holder of a slip ring and brush assembly, wherein said slip ring and brush assembly comprises at least one slip ring with a radius of curvature R and at least one brush holder for holding a brush therein to abut the slip ring and being adjustably mounted to the slip ring; said method comprising the following steps:
   inserting a test tool in said brush holder;
   adjusting an adjustable connection of said brush holder until a position has been reached in which said test tool indicates that a correct positioning of the brush holder has been achieved; and
   fixating said brush holder in said position.

2. The method according to claim 1, wherein said brush holder defines an opening into which said test tool can be push-fitted along a pre-defined one-dimensional path in the brush holder.

3. The method according to claim 1, wherein said test tool comprises areas or points of contact along a concave surface having a radius of curvature R corresponding to the slip ring radius of curvature R; said tool indicating correct position of the test tool when said areas or points of contact abut the slip ring.

4. The method according to claim 1, wherein in said step of inserting a test tool, the brush holder leads the test tool into a unique position in the brush holder when the test tool contacts the slip ring.

5. The method according to claim 1, wherein the indication that a correct positioning of said brush holder is obtained is established through the steps of:
   bringing together said test tool and said slip ring, thereby actuating an actuator of the test tool, and thereby causing an indicator to indicate full contact.

6. The method according to claim 1, wherein said slip ring and brush assembly comprises at least six brush holders and said test tool is used with all of these during installation of said slip ring and brush assembly.

7. The method according to claim 1, wherein said adjustable connection allows the brush holder to perform a rotational movement of the brush holder; the correct position being achieved through rotational adjustment.

8. The method according to claim 1, wherein said step of fixating said brush holder includes tightening one or more bolts of said adjustable connection.

9. The method according to claim 1, wherein said brush holder comprises releasable clamps for allowing fixation of said test tool in said brush holder and further allowing removal of said test tool from said brush holder.

10. The method according to claim 1, further comprising the step of removing said test tool and the step of inserting a brush in the fixated brush holder.

11. The method according to claim 1, wherein said slip ring and brush assembly is mounted in a wind turbine.

12. A test tool for indicating correct mounting of a brush holder on a generator or a motor equipped with slip ring systems;
   said test tool comprising an elongate form with a constant cross-section so that it can be inserted into a brush holder of a slip ring and brush assembly and further comprising areas or points of contact along a concave surface of radius of curvature R;
   said test tool comprising an actuator for being actuated when said areas or points of contact is brought together with an object with a radius of curvature R; and
   said test tool comprising an indicator to indicate actuation of said actuator,
   wherein the test tool is shaped similar to a brush to be inserted into said brush holder in the relevant dimensions such that the test tool upon insertion in the brush holder will follow the same pre-defined one-dimensional path in the brush holder and stop at the same unique position in the brush holder as the position where the brush would stop upon insertion.

13. The test tool according to claim 12, wherein said points of contact comprises at least one concave contact surface spanning a radius of curvature R.

14. The test tool according to claim 12, wherein said test tool further comprises at least one indentation at an end of the test tool opposite said areas or points of contact for receiving part of releasable clamps when inserted into a brush holder.

15. The test tool according to claim 12, wherein said test tool comprises an inside chamber comprising an electronic circuit to provide for a signal from said actuator to said indicator.

16. The test tool according to claim 12, wherein said actuator is a push button actuator.

17. The test tool according to claim 12, wherein said indicator is an LED.

18. The test tool according to claim 12, wherein the radius of curvature R is between 50 and 500 mm.

19. A brush assembly comprising a brush holder and a test tool according to claim 12.

20. A slip ring and brush assembly comprising a brush assembly according to claim 19.

21. A method of adjusting a brush holder of a slip ring and brush assembly, wherein said slip ring and brush assembly comprises at least one slip ring with a radius of curvature R and at least one brush holder for holding a brush therein to abut the slip ring and being adjustably mounted to the slip ring; said method comprising the following steps:
   providing a brush holder having an adjustable connection and a pre-defined, one-dimensional path for insertion of a brush in the brush holder;
   inserting a test tool in said brush holder along the pre-defined, one-dimensional path, wherein the test tool is shaped similar to the brush to be inserted into said brush holder in the relevant dimensions such that the test tool upon insertion in the brush holder will stop at the same unique position in the brush holder as the position where the brush would stop upon insertion;
   adjusting an adjustable connection of said brush holder until a position has been reached in which said test tool indicates that a correct positioning of the brush holder has been achieved; and
   fixating said brush holder in said position.

* * * * *